Nov. 28, 1950　　　　A. KISSELL　　　　2,531,941
FISHHOOK
Filed June 1, 1945
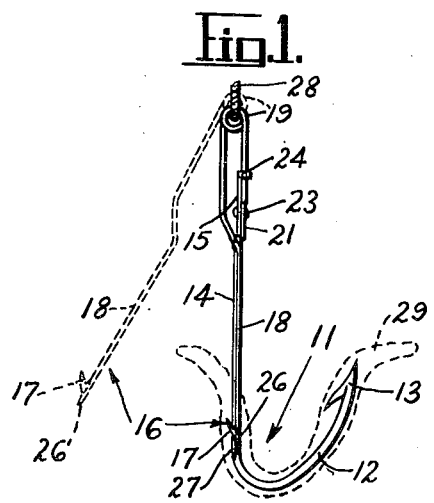
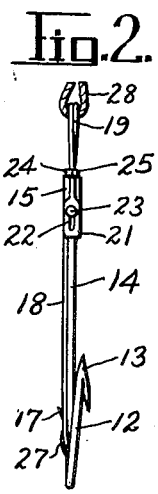
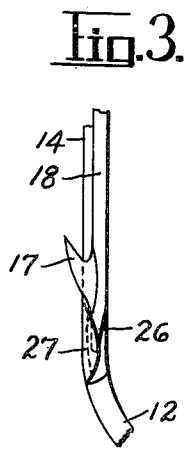
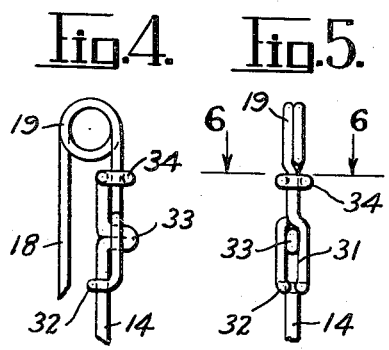
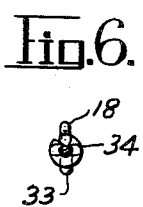
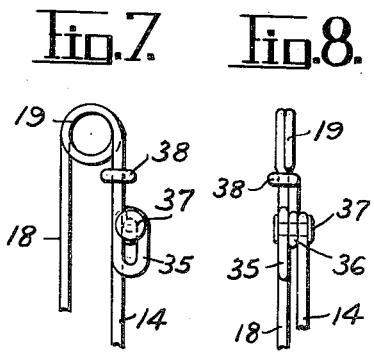
INVENTOR.
Albert Kissell.
BY
Walter S. Edwards
ATTORNEY Patented Nov. 28, 1950

2,531,941

UNITED STATES PATENT OFFICE 2,531,941

FISHHOOK

Albert Kissell, Woodbridge, Conn.

Application June 1, 1945, Serial No. 597,013

8 Claims. (Cl. 43—37)

1

This invention relates to fish hooks and more particularly to a form of fish hook having oppositely directed hook portions adapted to spread apart in the mouth of the fish to more securely hook the same. Fish hooks of this type may be divided into two classes, one in which the fish, when hooked, acts on the hook portions to cause them to spread apart, and the other in which an abrupt pull on the line or by the hooked fish on a portion of the hook will cause the hook portions to spread apart. The present invention relates to the latter class.

One object of this invention is to provide a fish hook having two hooks adapted to be separably joined to each other and to be abruptly separated to spread apart by a pull upwardly on the line, or a pull downwardly on one portion of the hook by a fish when hooked.

Another object is to provide in the structure of a fish hook a main hook portion, and a supplemental hook portion the shank of the latter portion being adapted to lie closely adjacent to, and substantially parallel with, the shank of the main hook portion and be separably attached thereto.

Still another object is to provide a two part spreadable fish hook having a main hook portion and a supplemental hook portion which hook portions are secured together for relative sliding movement to detach one from the other to allow them to spread apart.

A further object is to provide a two part separable fish hook adapted to have its parts lie closely together and be detachably secured in such position whereby bait may be readily retained thereon by a supplemental portion of the hook.

A still further object is to provide a fish hook of the above and analogous nature which will be relatively simple in construction, inexpensive to manufacture, compact, and very efficient and durable in use.

With these and other objects in view, which will appear as the description proceeds, there have been illustrated in the accompanying drawings three forms in which the features and principles of this invention may be embodied in practice, it being understood that various changes may be made within the scope of what is claimed without departing from the spirit and essential attributes of the invention.

In the drawings:

Figure 1 is a side view of a fish hook embodying the features and principles of this invention and comprising a main hook portion and a supplemental hook portion, the later being shown by dotted lines in its operable position when separated from the former;

Figure 2 is a front view of the same;

Figure 3 is an enlarged portion of the fish hook showing the detachable means for holding the hook portions in closed position;

2

Figure 4 is a side view of a modified form of means to slidingly secure the hook portions together;

Figure 5 is a front view of the means shown in Figure 4;

Figure 6 is a sectional view taken on the line 6—6 of Figure 5;

Figure 7 is a side view of another modified form of means to slidingly secure the two hook portions together; and Figure 8 is a front view of the form shown in Figure 7.

Referring now to the drawings wherein like reference numerals designate like parts throughout the several views, the numeral 11 denotes a main hook portion having an outwardly and upwardly curved end 12 terminating in the usual sharp spur 13. The main hook portion 11 has a shank 14 extending upwardly from the curved end 12 and which terminates (see Figure 1) in a flattened elongated pad 15.

A supplemental hook portion 16, having a spur 17 at its lower end, is provided with a shank 18 which extends upwardly from the spur 17 and terminates in a coiled loop. The material of the supplemental hook portion 16 after being coiled to form the loop 19 extends downwardly and terminates in an elongated pad 21. The pad 21 overlies the pad 15 of the main hook portion 11 and has an elongated slot 22 therein through which passes a rivet 23 secured to and extending from the pad 15. The upper end of the pad 15 is formed to provide ears 24 and 25 which are bent about the material of the supplemental hook portion between the pad 21 and the loop 19 to insure proper sliding movement between the pads 15 and 21.

The supplemental hook portion 16 is provided with a short pointed end 26 below the spur 17 and which is adapted to engage behind a catch lip 27 formed on the shank 14 of the main hook portion 11 when the hook portions are in the position shown in Figures 1, 2, and 3. The loop 19 is spring-tensioned to spring the supplemental hook portion away from the main hook portion (see dotted lines in Figure 1) when the hook shanks 14 and 18 are moved relatively to each other to release the pointed end 26, of the supplemental hook portion 16, from engagement with the catch lip 27, on the main hook portion 11. The line 28 is tied, or otherwise secured, to the loop 19 and the supplemental hook portion releasing movement above referred to is accomplished by an abrupt pull upwardly on the line 28, or a pull downwardly by a fish caught on the spur 13 of the main hook portion 11.

The shank 18 of the supplemental hook portion 16 is arranged to lie closely against the shank 14 of the main hook portion 11 when the former hook portion 16 is in set position as shown in Figures 1, 2, and 3. When the supplemental hook portion 16 is in set position its spur 17 extends outwardly in a direction opposite to the direction the spur 13 extends from the main hook portion 11 and forms means to securely hold and retain bait, such as a worm 29 (see dotted lines in Figure 1), on the hook of this invention. When the fish takes the bait the main hook portion 11 catches in one side of the fish's mouth and is pulled downwardly thereby while the supplemental hook portion is held by the line 28. This relative sliding movement results in releasing the supplemental hook portion 16 which springs outwardly to engage the other side of the fish's mouth to securely hook the fish.

In place of the pads 15 and 21, the hook portions 11 and 16 may be connected together for relative sliding movement as illustrated in Figures 4, 5, and 6. In the form of connection shown in these figures, the hook material extending from the loop 19 is bent about to form an elongated loop 31, the lower end portion of the loop 31 being bent transversely about the material of the shank 14 of the main hook portion 11 as indicated at 32. The upper end of the shank 14 is bent to form a lug 33 to extend outwardly through the elongated loop 31 of the hook portion 16. From the lug 33 the hook material is extended and transversely bent about the material of the hook portion 16 between the loop 19 and the elongated loop 31 as indicated at 34.

In the form shown in Figures 7 and 8 the hook material extending from the loop 19 is coiled forwardly and downwardly to form an elongated loop 35. The hook material at the upper end of the shank 14 of the main hook portion 11 extends upwardly and is coiled at 36 about a rivet 37 which extends through the elongated coiled loop 35. The material from the coil 36 extends upwardly and is bent about the material of the hook portion 16 between the loop 19 and the elongated loop 35 as indicated at 38. In all of the above forms of connections between the hook portions relative sliding movement is permitted whereby the supplemental hook 16 will be released from the main hook portion 11 by a pull on the line 28.

It will be understood that the features and principles of this invention may be embodied in other specific forms without departing from the spirit and essential attributes thereof, and it is therefore desired that the present embodiments be considered in all respects as illustrative, and not restrictive, reference being had to the claims rather than to the foregoing description to indicate the scope of the invention.

Having thus fully described the invention, what is claimed as new and for which it is desired to secure Letters Patent, is:

1. In a fish hook, a main hook portion having a shank, and a supplemental hook portion having a shank, one of said hook portions being laterally springable away from the other, means to connect said hook portions together for relative vertical sliding movement, a catch lip on the shank of one of said hook portions, and a catch end on the shank of the other adapted to be disposed in catch connection with said lip to hold said shanks closely adjacent each other and to be released upon the vertical sliding movement in one direction of one hook portion relatively to the other.

2. In a fish hook, a main hook portion having a shank, a supplemental hook portion having a shank, said shanks being adapted to lie closely adjacent to each other, means to spring one of said hook portions laterally away from the other, means to connect said hook portions together for relative vertical sliding movement, and means to releasably connect said hook portions together with their shanks disposed closely adjacent each other and being releasable to permit said one hook portion to spring laterally away from the other when said hook portions are moved vertically relatively to each other in one direction.

3. A fish hook comprising a main hook part having a spur portion and a shank portion and a curved hook portion, a supplemental hook part having a spur portion and a shank portion, said spur portions being oppositely laterally directed, catch means between said hook parts, and means to connect the shank portions of said hook parts for relative vertical sliding movement to disconnect said catch means, the shank portion of the supplemental hook part being tensioned to swing said supplemental hook part laterally away from the main hook part when the catch means is disconnected.

4. A fish hook comprising a main hook part having a shank portion and a curved hook portion, a supplemental hook part having a spur portion and a shank portion, said hook portion and said spur portion being oppositely laterally directed, catch means between said hook parts, said shank portions being adapted to lie closely adjacent each other when said hook parts are connected by said catch means, means to laterally swing said supplemental hook part away from the main hook part when the catch means is released, and means to connect the shank portions of said hook parts together for relative vertical sliding movement to release said catch means.

5. A fish hook comprising a main hook part having a shank portion and a curved hook portion, a supplemental hook part having a spur portion and a shank portion, said hook portion and said spur portion being oppositely laterally directed, catch means between said hook parts, said catch means comprising a catch lip on one hook part and an extension on and extending beyond the other hook part, said lip and said extension being adapted to engage to releasably hold the hook parts together with their shank portions disposed in juxtaposed position, means to spring said supplemental hook part laterally away from the main hook part when the catch means is released, and means to connect the shank portions of said hook parts together for relative vertical sliding movement to move the catch extension out of engagement with said catch lip.

6. In a fish hook, a main hook portion having a shank and a spur end, a supplemental hook portion having a shank and a spur with a pointed end extending therefrom, said supplemental hook portion being spring-tensioned to spring away from said main hook portion, a catch lip on said main hook portion adapted to engage said pointed end on said supplemental hook portion, and means connecting said hook portions together for relative sliding movement in one direction to disconnect said end from said catch lip.

7. In a fish hook a main hook portion having a shank and a spur end, a supplemental hook portion having a shank and a spur with a pointed end extending therefrom, said supplemental hook portion being spring-tensioned to spring away from said main hook portion, a catch lip on said main hook portion adapted to engage said pointed end on said supplemental hook portion, said hook shanks being adapted to lie closely adjacent each other when said hook portions are set in closed position by the engagement of said end with said catch lip, said spurs being oppositely directed when said shanks are lying closely adjacent each other, and means connecting said hook portions together for relative sliding movement in one direction to disconnect said end from said catch lip.

8. In a fish hook, a main hook portion having a shank and a spur end, a supplemental hook portion having a shank and a spur adjacent its end and with its end extending beyond the spur, said supplemental hook portion being spring tensioned to swing away from the main hook portion, catch means on said main hook portion adapted to engage the extending shank end of the supplemental hook portion and to be disengaged upon sliding movement of one hook portion relatively to the other in the direction of the shanks thereof, and means to slidingly connect the shanks of said hook portions.

ALBERT KISSELL.

REFERENCES CITED

The following references are of record in the file of this patent:

UNITED STATES PATENTS

| Number | Name | Date |
| --- | --- | --- |
| 666,309 | Fiege | Jan. 22, 1901 |
| 1,379,422 | Thorsten | May 24, 1921 |
| 1,717,190 | Coleman | June 11, 1929 |
| 2,148,074 | Kaspick | Feb. 21, 1939 |
| 2,385,602 | Birkemeier | Sept. 25, 1945 |

FOREIGN PATENTS

| Number | Country | Date |
| --- | --- | --- |
| 44,498 | Sweden | Sept. 4, 1918 |
| 47,771 | Sweden | Sept. 22, 1920 |